United States Patent [19]

Shoop et al.

[11] 3,763,882
[45] Oct. 9, 1973

[54] MINIMUM PRESSURE VALVE FOR LIQUID INJECTED GAS COMPRESSOR

[75] Inventors: John C. Shoop; Robert R. Anderson, both of Quincy, Ill.

[73] Assignee: Gardner-Denver Company, Quincy, Ill.

[22] Filed: Apr. 14, 1972

[21] Appl. No.: 244,186

[52] U.S. Cl. .............................. 137/494, 137/529
[51] Int. Cl. ............................................ F16k 15/00
[58] Field of Search ................... 55/418; 137/494, 137/538, 542, 540, 513.3, 513.5, 529

[56] References Cited
UNITED STATES PATENTS

| | | | |
|---|---|---|---|
| 3,087,426 | 4/1963 | Foster | 137/529 X |
| 1,578,046 | 3/1926 | Logan | 137/542 |
| 1,092,231 | 3/1933 | Gurley | 137/540 |
| 2,635,620 | 4/1953 | Deardorff | 137/494 X |

Primary Examiner—Henry T. Klinksiek
Assistant Examiner—Robert J. Miller
Attorney—Michael E. Martin

[57] ABSTRACT

A minimum pressure valve for controlling the pressure in the compressed gas discharge line of a liquid injected gas compressor downstream of the compressor liquid separator element. The minimum pressure valve includes a closure member which is biased to the closed position by a coil spring and which includes opposed pressure surfaces which are acted on by fluid at the pressure upstream of the valve, and a pressure surface which is acted on by fluid at atmospheric pressure. The combined spring and pressure forces provide for improved valve operating characteristics to maintain a desired minimum pressure upstream of the valve and negligible pressure losses through the valve at compressor operating conditions greater than the desired minimum pressure.

5 Claims, 3 Drawing Figures

PATENTED OCT 9 1973

3,763,882

MINIMUM PRESSURE VALVE FOR LIQUID INJECTED GAS COMPRESSOR

BACKGROUND OF THE INVENTION

In liquid injected gas compressor systems there is usually provided liquid separator means for separating the injected liquid from the compressed gas downstream of the compressor proper. Generally, the effectiveness of known liquid separator means is dependent on the flow velocity of the gas-liquid mixture passing through the separator. Accordingly, it is desirable to limit the velocity of the compressed gas flow through the liquid separator in order to prevent the continued entrainment of liquid in the discharge gas. For example, liquid injected air compressors operating at nominal discharge pressures in the range of 100–125 p.s.i.g. require that the discharge pressure in the separator be limited to 60–70 p.s.i.g. in order to limit gas flow velocities to values which provide for effective liquid separation.

To provide this minimum pressure value, regardless of pressure conditions in the compressed air distribution line downstream of the liquid separator, prior art compressor systems have utilized various types of flow restrictors such as orifices and pressure relief valves, the latter generally being of the spring biased poppet type. Known types of minimum pressure devices suitably provide for the desired minimum pressure to be maintained in the liquid separator but their operating characteristics are such that pressure losses occur through the devices when operating at pressure conditions greater than the minimum pressure value. Such pressure losses are unwanted and render compressor systems using such devices less efficient than desired.

SUMMARY OF THE INVENTION

The present invention provides an improved minimum pressure valve for a liquid injected gas compressor system wherein a desired minimum pressure may be provided in the compressor liquid separator tank and pressure losses through the valve itself are negligible for working pressures above the predetermined minimum pressure.

The present invention also provides a minimum pressure valve which includes a closure member which is responsive to pressure fluid forces acting thereon to maintain a predetermined minimum pressure upstream of the valve proper and to provide for negligible pressure losses in the gas flow stream through the valve for working pressure conditions greater than the predetermined minimum pressure.

With the minimum pressure valve of the present invention there is provided a compact and mechanically uncomplicated valve structure which may be easily fitted in the compressor discharge gas conduit downstream of the liquid separator.

DESCRIPTION OF THE PREFERRED EMBODIMENT

Figure 1:
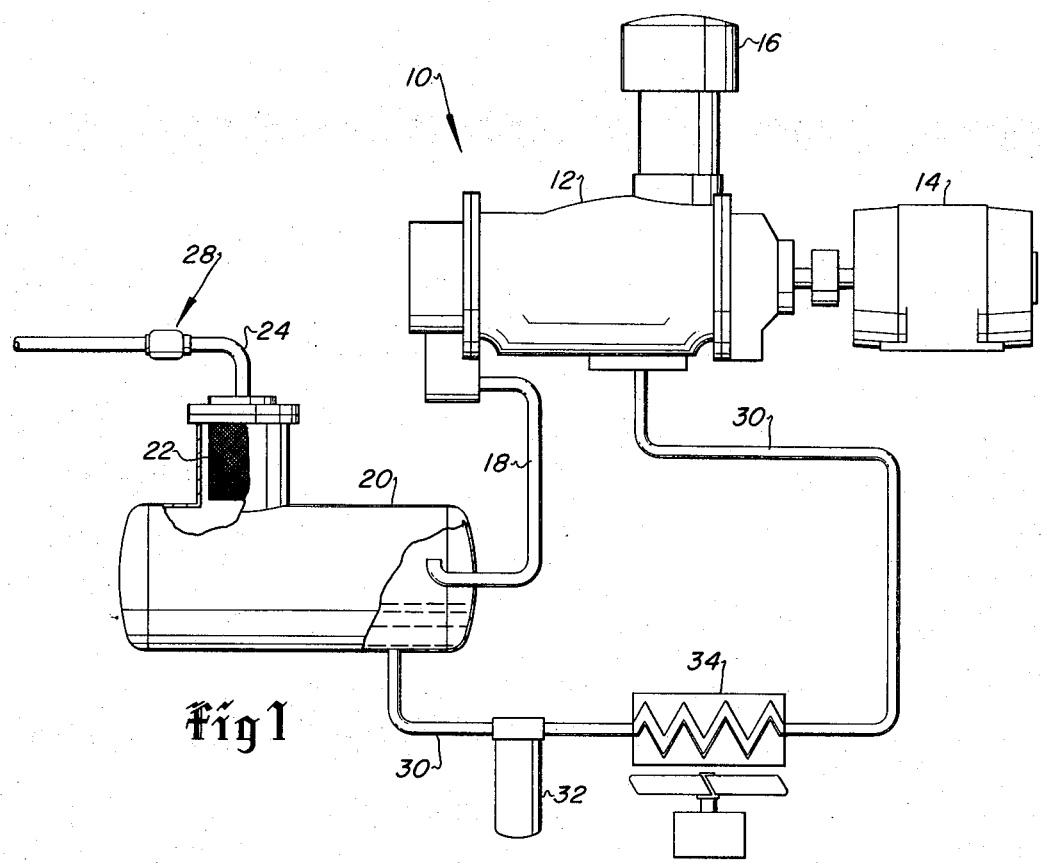
FIG. 1 is a schematic view of a liquid injected gas compressor system including the minimum pressure valve of the present invention.

Referring to the drawing, FIG. 1 shows a schematic of a liquid injected compressor system 10 including a compressor 12 connected to a suitable prime mover such as the motor 14. The compressor 12 is of a type suitable for injection of liquid into the compressor working chamber, not shown, to be mixed and entrained with the gas being compressed. Such types of compressors include the well known rotary vane and helical screw types, as examples. The compressor 12 includes an inlet 16 and a discharge conduit 18 leading to a combination gas receiving and liquid storage and separating tank 20. The tank 20 is of a type in which the major portion of the liquid entering the tank and entrained with the compressor discharge gas is separated by inertial action. The tank 20 also includes, however, liquid separation means comprising an impingement type separator element 22 of a type well known and similar to the separator element disclosed in U.S. Pat. No. 3,291,385 to R.F. Williams et al. The separator element 22 is required for separating small drops of liquid which cannot be removed from the gas flow stream by inertial action alone. The compressor system of FIG. 1 also includes a compressed gas discharge conduit 24 connected to the tank 20 downstream of the separator element 22. The conduit 24 has disposed therein a minimum pressure valve 28 for automatically maintaining a minimum pressure of fluid in the tank 20. The compressor system of FIG. 1 further includes a conduit 30 for carrying liquid back to the compressor 12 for reinjection into the aforementioned working chamber. A filter 32 and a heat exchanger 34 are interposed in the conduit 30 for conditioning the liquid for injection into the compressor.

In order to prevent the entrainment of liquid in the compressed gas beyond the separator element 22 it is necessary that the velocity of the gas flow through the separator element be limited to a predetermined maximum value. This predetermined maximum velocity can be maintained by controlling the pressure in the separator tank at a point just downstream of the separator element. For a given compressor gas throughout capacity there will be a predetermined minimum pressure value which must be maintained in the tank 20 to prevent the gas flow velocity through the separator element 22 from exceeding a maximum value for effective liquid separation. MOreover, in the gas compressor system 10 liquid is returned to the compressor 12 by the pressure difference between the tank 20 and a suitable injection opening in the compressor. Therefore, it is necessary that a predetermined minimum pressure be provided in the tank 20 when the compressor is operating to assure that a suitable flow of liquid to the compressor is maintained. The compressor system 10 advantageously utilizes the valve 28 and thereby does not require a liquid injection pump. Accordingly, the valve 28, disposed in the compressed gas discharge conduit 24 downstream of the separator element 22, provides for a minimum fluid pressure in the tank 20 regardless of the compressed gas demand on the compressor system 10.

Figure 2:
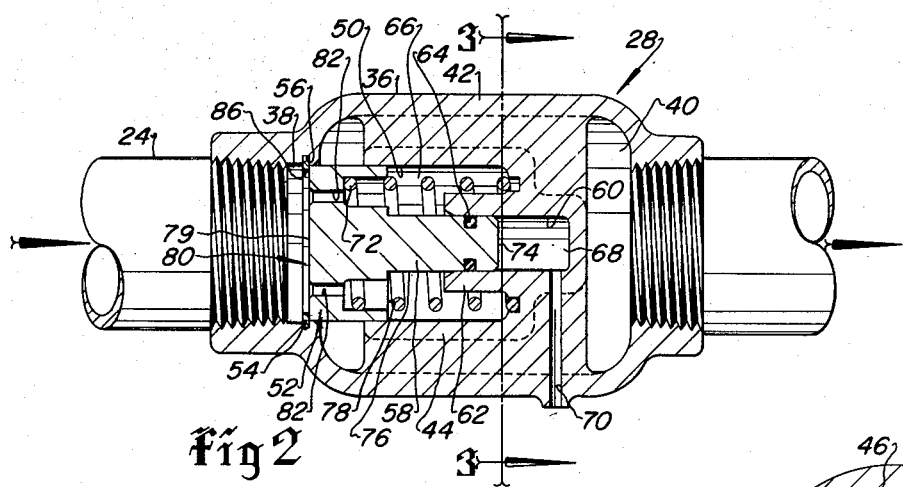
FIG. 2 is a longitudinal section view of the minimum pressure valve.
Figure 3:
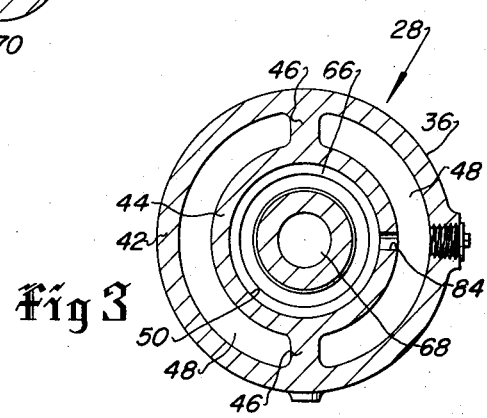
FIG. 3 is a transverse section taken along the line 3—3 of FIG. 2.

Referring to FIGS. 2 and 3 also, the minimum pressure valve 28 comprises a housing 36 having inlet and outlet openings 38 and 40 respectively. The inlet and outlet openings 38 and 40 are suitably formed for connecting the valve 28 directly to the conduit 24 and are substantially coaxial to provide for placement of the valve in the conduit in an in-line manner. The valve housing 36 is characterized by an outer wall 42 and an inner cylindrical housing portion 44 spaced from the outer wall and supported by radially extending webs 46. The interior of the valve housing 36 formed between the outer wall 42 and the inner valve housing portion 44 comprises a passage 48 interconnecting the inlet and outlet openings 38 and 40. The inner housing 44 includes a cylindrical bore 50 in which is slidably disposed in close fitting relationship a piston type closure member 52. The closure member 52 is engageable with a valve seat 54 comprising a suitable retaining ring removably fitted in a groove 56 in the valve housing. The closure member 52 includes an integral cylindrical stem portion 58 which is slidably disposed in a bore 60 formed in an axially projecting portion 62 of the inner housing 44. An O-ring 64 disposed in a suitable groove on the stem 58 prevents leakage of pressure fluid from a first chamber 66 formed by the bore 50 into a second chamber 68 formed by the bore 60. A radially extending passage 70 in the valve housing 36 provides an opening from the chamber 68 to the exterior of the valve. The closure member 52 is biased to be engaged with the valve seat 54 by resilient means comprising a coil spring 72 disposed in the chamber 66.

The closure member 52 is characterized by a plurality of pressure surfaces which are responsive to pressure fluid acting thereon to move the closure member to provide for a predetermined minimum fluid pressure upstream of the valve seat 54 when the pressure in the passage 48 drops to a value below the predetermined minimum. The pressure surfaces on the closure member 52 also provide for moving the closure member to open to provide substantially unrestricted fluid flow through the valve when the pressure in the passage 48 exceeds the predetermined minimum pressure. The aforementioned pressure surfaces includes a first pressure surface defined by the transverse face 74 on the end of the stem 58 which is continuously exposed to atmospheric pressure or the pressure exterior of the valve 28. A portion of the closure member 52 defined by the axially projected area between the diameter 76 of the stem 58 and the outside diameter of the closure member and facing the chamber 66, comprises a second pressure surface 78 which is responsive to pressure in the chamber 66 to bias the closure member 52 toward the seat 54.

The closure member 52 further includes a transverse face 79 engageable with the valve seat 54 and forming a third pressure surface 80 opposed to the pressure surfaces 74 and 78. The pressure surface 80 is defined by the total area of the face 79 and is responsive to fluid pressure in the inlet opening 38 to move the closure member 52 away from the seat. Orifice means 82 open through the surface 80 into the chamber 66 placing the inlet opening 38 in communication with the chamber. Second orifice means 84 open from the chamber 66 through the housing portion 44 into the passage 48.

The valve 28 is formed to provide for the closure member 52 to move toward the closed position to maintain a predetermined minimum pressure in the inlet opening 38 when the pressure in the passage 48 becomes less than the predetermined minimum pressure. Moreover, it is desired that the valve 28 cause a negligible pressure loss in the fluid flowing through the valve for pressure conditions in the passage 48 greater than the minimum pressure. Conventional valves which use a mechanical coil spring as the sole biasing means for closing the vlave require a spring of substantial stiffness to meet the required operating condition for use in compressor systems. Stiff springs require heavy wire and, accordingly, occupy more space in the valve interior housing portion. Additionally, a practical limit on spring length usually does not provide for sufficient spring travel before reaching the collapsed condition which is commensurate with an open valve position which provides sufficient flow area between the closure member and the valve seat to prevent unwanted pressure losses through the valve. For example, a minimum pressure valve for a compressor system which normally supplies pressure fluid at 100 p.s.i.g. working pressure would be designed to have its closure member fully open at 100 p.s.i.g. to provide maximum flow area between the closure member and the valve seat to thereby eliminate any pressure losses at the normal working condition of the valve.

With the valve 28 of the present invention pressure fluid from the inlet opening 38 is admitted to the chamber 66 to act on pressure surface 78 to bias the closure member 52 toward the seat 54. The pressure forces acting on surface 78 thereby provide for the coil spring 72 to be less stiff than would be required without the use of pressure fluid to bias the closure member. When the valve 28 is operating at flow conditions greater than the minimum pressure the pressure in chamber 66 is substantially the same as the pressure in the inlet opening 38. This is true, even though the orifice means 84 is in communication with the passage 48, due to the fact that it is assumed there is negligible pressure drop through the valve at pressures above the minimum pressure value.

The provision of the orifice 84 also prevents the occurrence of an unwanted operating condition of the valve 28 which could take place following the compressor system 10 being shut down and restarted with the discharge line 24 vented or open. Assuming the discharge line was vented to a pressure below the minimum pressure on both sides of the valve 28 the closure member 52 would be seated fully against the seat 54 and the effective area of the pressure surface 80 would be reduced to the area of the face 79 defined by the inner circumference 86 of the seat 54. Accordingly, without the provision of the orifice 84, forces due to fluid acting on pressure surface 78 and the spring 72 would act to hold the closure member 52 closed against the seat 54 until a pressure substantially above the minimum pressure was reached which would be sufficient to cause unseating of the valve. Such a high pressure could cause premature actuation of the compressor controls to shut down the compressor system or cause actuation of overpressure valves to vent the tank 20. However, by proper selection of the sizes of the orifices 82 and 84 the pressure in the chamber 66 can be controlled such that a resultant force acting on the closure member 52 will provide for opening the valve 28 at the minimum pressure condition. The provision of the orifice 84 is considered desirable in lieu of reducing the area of the pressure surface 78 which for normal operation of the valve would then require a stiffer spring.

What is claimed is:

1. In a gas compressor system including a compressor, a liquid separator tank connected to said compressor, liquid separator means disposed in said tank, and a discharge conduit connected to said tank downstream of said separator means for conducting substantially liquid free gas from said tank, the improvement comprising:

a minimum pressure valve disposed in said conduit downstream of said separator means including a valve housing having inlet and outlet openings and passage means interconnecting said openings, a closure member comprising a piston slidably disposed in a first chamber formed in said valve housing and movable toward and away from a valve seat to maintain a predetermined minimum pressure in said tank, means for biasing said piston toward said seat including a stem portion disposed in a second chamber formed in said housing and having a transverse face forming a first pressure surface facing said second chamber and in communication with fluid at the pressure exterior of said valve, and a portion facing said first chamber and forming a second pressure surface in communication with fluid at the pressure in said inlet opening; and, a transverse face on said piston comprising a third pressure surface opposed to said second pressure surface and facing said inlet opening and in communication with fluid at the pressure in said inlet opening for biasing said piston away from said seat.

2. The invention set forth in claim 1 wherein:
said means for biasing said piston toward said seat includes resilient means engageable with said piston.

3. The invention set forth in claim 2 wherein:
said resilient means comprises a coil spring.

4. The invention set forth in claim 1 wherein:
said piston includes orifice means opening through said third pressure surface into said first chamber.

5. The invention set forth in claim 4 wherein:
said valve includes orifice means opening from said first chamber into said passage means.

* * * * *